United States Patent [19]
Billovits et al.

[11] Patent Number: 5,134,201
[45] Date of Patent: Jul. 28, 1992

[54] MISCIBLE POLYESTER BLENDS

[75] Inventors: Gerald F. Billovits; Michael N. Mang; Jerry E. White, all of Midland, Mich.

[73] Assignee: The Dow Chemical Company, Midland, Mich.

[21] Appl. No.: 783,652

[22] Filed: Oct. 28, 1991

[51] Int. Cl.$^5$ .................... C08L 67/00; C08L 67/06
[52] U.S. Cl. .................... 525/423; 525/530; 525/523; 525/933; 528/87; 528/176
[58] Field of Search ............ 525/423, 427, 530, 523, 525/931, 932, 933; 528/87, 93, 176, 182, 297, 361

[56] References Cited

U.S. PATENT DOCUMENTS

| | | | |
|---|---|---|---|
| 3,477,990 | 11/1969 | Dante et al. | 528/87 |
| 3,948,855 | 4/1976 | Perry | 528/87 |
| 4,661,541 | 4/1987 | Batzill et al. | 528/99 |
| 4,713,269 | 12/1987 | Jabarin et al. | 525/933 |
| 4,713,270 | 12/1987 | Jabarin et al. | 525/933 |
| 4,729,927 | 3/1988 | Hirose et al. | 525/933 |
| 4,742,096 | 5/1988 | Craun | 523/400 |
| 5,003,041 | 3/1991 | Morris et al. | 525/933 |

FOREIGN PATENT DOCUMENTS 0309947 of 0000 Japan.
62-25151 7/1985 Japan.

Primary Examiner—Melvyn I. Marquis
Assistant Examiner—Randy Gulakowski

[57] ABSTRACT

Miscible blends of (1) a thermoplastic methylol polyester having backbone repeating units containing pendent hydroxyl and methylol moieties and divalent organic moieties such as 1,3-phenylene, 1,4-phenylene, 2,6-naphthalene, biphenylene and isopropylidene diphenylene, and (2) a linear, saturated polyester or copolyester of aromatic dicarboxylic acids, such as poly(ethylene-co-1,4-cyclohexanedimethylene terephthalate) (PETG) and poly(ethylene terephthalate) (PET), have improved clarity and exhibit enhanced barrier to oxygen relative to PET and PETG.

15 Claims, No Drawings

MISCIBLE POLYESTER BLENDS

BACKGROUND OF THE INVENTION

This invention relates to thermoplastic polyesters, more particularly to blends of thermoplastic polyesters having gas barrier properties, and to articles prepared from such polyesters.

Thermoplastic polyesters such as poly(ethylene terephthalate) (FET) are used commercially in the packaging of various materials such as seasonings, carbonated beverages. detergents, cosmetics, and the like, because of their transparency, low permeability to oxygen, carbon dioxide, and water vapor, as well as low permeability to various products indigenous to foods. See "Thermoplastic Polyester Resins for Containers", D. P. Callander, Polym. Sci. Eng., 1985, 25(8), 453–457. While poly(ethylene terephthalate) exhibits adequate barrier properties for packaging some materials. its oxygen barrier properties are inadequate for the packaging of more oxygen sensitive foodstuffs and beverages such as beer, wine, or low acid foods such as meats or vegetables.

It is known that the barrier properties of thermoplastic polyesters can be improved by preparing immiscible blends of polyesters and hydroxyphenoxy ethers or hydroxyphenoxy ether esters, as is disclosed in Japanese Patents Shotsugan Kokai 62-25151 and 62-15255. However, there are several disadvantages to the immiscible blends disclosed in these patents. First, as disclosed in Japanese Patent Shotsugan Kokai 63-206560, unless the refractive indices of the blend components are very close (i.e., refractive index difference between blend components <0.005), blends of immiscible polymers are usually opaque because of multiple internal refraction as light passes through their distributed phase morpholohy. Second, immiscible blends may require compatibilizers to maximize adhesion between phases to insure acceptable physical properties, as is disclosed in Japanese Patent Shotsugan Kokai -64-210454. The inhomoheneous morpholohy of an immiscible blend may also lead to undesirable permeability differences in fabricated articles due to uneven distribution of the dispersed phase during fabrication. Immiscible blends also have generally higher permeabilities to gases such as oxygen or carbon dioxide.

In view of the limitations of the prior art, it would be desirable to provide polyester compositions with improved barrier to the permeation of gases and water vapor, and have improved clarity, yet which are not subject to the limitations found in immiscible blends.

SUMMARY OF THE INVENTION

The present invention is, in one aspect, a thermoplastic polymeric composition comprising a miscible blend of components:

A) a linear, saturated polyester of aromatic diacids; and

B) a thermoplastic methylolpolyester which is miscible with Component A and which has repeating units represented by the formula:

Formula I

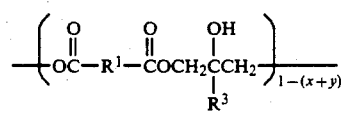

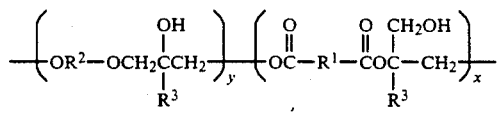

wherein each of $R^1$ and $R^2$ is individually a divalent organic moiety which is predominantly hydrocarbon, each $R^3$ is individually hydrogen or lower alkyl, y is about 0.5, and x is a fraction from about 0.05 to about 0.4, said component B being present in an amount sufficient to provide improved oxygen barrier properties as compared to a composition which does not contain Component B.

In a second aspect, this invention is an article suitable for packaging oxygen-sensitive materials such as foodstuffs, beverages, low acid foods and medicines, wherein the article is fabricated of the above polymeric composition.

In addition to their use as barrier containers and films, the polymeric compositions of this invention are also useful as molding, extrusion and casting compositions.

DETAILED DESCRIPTION OF THE INVENTION

Preferably, Component A is a linear, saturated polyester or copolyester of aromatic dicarboxylic acids such as poly(ethylene terephthalate), poly(butylene terephthalate), poly(ethylene 2,6-naphthalenedicarboxylate), poly(ethylene-co-1,4-cyclohexanedimethylene terephthalate), with poly(ethylene-co-1,4-cyclohexanedimethylene terephthalate) and poly(ethylene terephthalate) being most preferred. These linear polyesters are described in more detail in U.S. Pat. No. 4,753,979, the relevant portions of which are incorporated herein by reference.

Preferably, Component B is a thermoplastic methylol polyester having repeating units represented by the formula:

Formula I

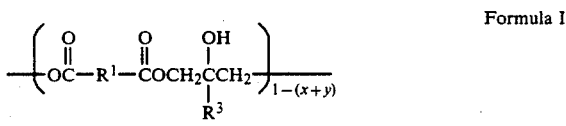

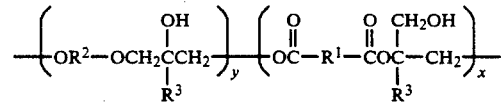

wherein $R^1$ is a first divalent organic moiety such as 1,3-phenylene, 1,4-phenylene, 2,6-naphthalene, biphenylene, or mixtures thereof and, optionally, minor amounts of a second divalent organic moiety which is different from the first divalent organic moiety, such as alkylene, cycloalkylene, alkenylene, arylene, alkylarylene, dialkylenearylene, diaryleneketone, diarylenesulfone, diarylenesulfoxide, alkylidenediarylene, diaryleneoxide, diarylenesulfide, and diarylenecyanomethane, said minor amounts being such that the mole ratio of 1,3-phenylene, 1,4-phenylene, 2,6-naphthalene, and/or biphenylene to the second divalent organic moiety is greater than about 0.80, with the proviso that Component B remains miscible with Component A. $R^2$ is bisphenyleneisopropylidene and, optionally, minor amounts of the second divalent organic moiety, said minor amount being such that the mole ratio of bisphenyleneisopropylidene to the second divalent organic moiety is greater than about 0.80, with the proviso that Component B remains miscible with Component A. Each $R^3$ is individually hydrogen or lower alkyl such as methyl, ethyl, or propyl, y is about 0.5 and x is a fraction from about 0.05 to 0.5.

Preferably, Component A is present in an amount of from about 5 to about 95 weight percent of the blend and Component B is present in an amount of from about 95 to about 5 weight percent of the blend.

Most preferably, Component B is a thermoplastic methylol polyester having repeating units represented by the formula:

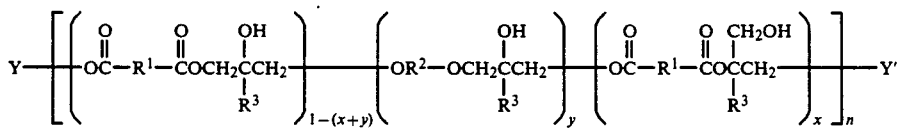

Formula II wherein $R^1$, $R^2$, $R^3$, x and y as defined above and n is a whole number from 10 to 1000. Typically, Y is hydrogen and Y' is glycidyl arylene ether or glycidyl alkylene ether.

The methylol polyesters are advantageously prepared by contacting one or more diglycidyl ethers of 4,4'-isopropylidene bisphenols (bisphenol A) and, optionally, minor amounts of other dihydric phenols, with one or more diacids or anhydrides under conditions including the use of an onium catalyst sufficient to cause the acid moieties to react with epoxy moieties to form a polymer backbone having ester linkages and pendant methylol moieties. Also, the polyesters are optionally terminated by including monofunctional acids or glycidyl compounds by methods well known to those skilled in the art. These methylol polyesters are described in more detail in copending U.S. Pat. Application Ser. No. 07/699,046, filed on May 13, 1991, which is incorporated herein by reference.

The methylol polyesters are suitably prepared at temperatures in the range of from about 60° C. to about 160° C. under an inert atmosphere. Preferred conditions for preparing such methylol polyesters are set forth in the following working examples.

Examples of optional dihydric phenols present in minor amounts in Component B include 4,4'-dihydroxydiphenylethylmethane, 3,3'-dihydroxydiphenyldiethylmethane, 4,4'-biphenol, 4,4'-dihydroxydiphenyloxide, 4,4'-dihydroxydiphenylcyanomethane, 4,4'-dihydroxydiphenylbenzophenone, 4,4'-dihydroxydiphenylsulfide, 4,4'-dihydroxydiphenylsulfone, 2,6-dihydroxynapthalene, 1,4-dihydroxynapthalene catechol, resorcinol, hydroquinone, and other dihydric phenols listed in U.S. Pat. Nos. 3,395,118; 4,438,254; and 4,480,082 which are hereby incorporated by reference.

Examples of preferred onium catalysts include tetrahydrocarbyl quaternary ammonium halides wherein hydroxycarbyl is monovalent hydrocarbon radical such as alkyl, aryl, cycloalkyl, aralkyl, and alkaryl, preferably having from 1 to 16 carbon atoms. Examples of preferred onium catalysts include tetrakis(n-butyl) ammonium bromide and the corresponding chloride, iodide, and fluoride, with tetrakis(n-butyl) ammonium bromide being the most preferred. Other suitable onium catalysts include tetrahydrocarbyl phosphonium halides such as ethyltriphenylphosphonium iodide and tetraphenylphosphonium bromide.

In addition to the above components, the blends of the present invention can advantageously contain other additives such as plasticizers, antioxidants, stabilizers, fibers, mineral fillers, dyes, pigments, and the like.

The blends of the present invention can be prepared by any convenient process for example, by bringing the components in solid form and dry-blending using conventional means such as a barrel mixer, a tumble mixer, and the like, followed by fluxing or melting in an appropriate apparatus, such as a Banbury type internal mixer, rubber mill, single or twin screw extruder or compounder, or the like. Preferably, the two components are brought together and processed in an appropriate melt extruder, from which the blend is extruded in the form of strands which are pelletized for fabrication purposes. Techniques well known to those skilled in the art can be used for these purposes. The most preferred conditions for preparing the blends of the present invention are set forth in the following working examples.

In the generally accepted sense, two polymers are miscible when they form a single phase solid solution. Miscibility of a blend of polymers may be confirmed by a single $T_g$ for the blend, if the $T_g$'s of the individual pure components are substantially different, as measured by calorimetry or dynamic mechanical analysis, or by optical clarity of the blend. A single $T_g$ for the blend is not necessarily an indication of miscibility of the blend. The single $T_g$ may be the result of the proximity of the $T_g$'s of the individual components. When two polymers exhibit different $T_g$'s or loss tangent peaks, they demonstrate immiscibility by forming two phases in a blend, each of which retains the $T_g$'s or loss tangent peak of the pure components. Partially miscible blends exhibit shifted or broadened loss tangent peaks relative to the individual pure components. When two polymers are miscible, a mixture provides a stable blend possessing optical clarity and a useful balance of mechanical properties equal or superior to such properties for the individual components. By contrast, when two polymers are immiscible, the mixture is generally opaque and exhibits mechanical properties which are lower than for the individual components.

The present invention yields blends of miscible polyesters and methylol polyesters that possess surprisingly lower oxygen transmission rates than expected based on the permeabilities of the individual components, as well as provides compositions that possess desirable optical clarity.

The invention is now described with reference to the following examples which are for purposes of illustration only and are not intended to imply any limitation on the scope of the invention.

EXAMPLES

The poly(ethylene terephthalate) (PET) used in the examples is a commercial product produced by Eastman Kodak PET (Kodapak 7741). The poly(ethylene-co-1,4-cyclohexanedimethylene terephthalate) (PETG) used in the examples is a commercial product produced by Eastman Kodak (Kodak 5445). Unless otherwise stated, all parts and percentages are by weight. Oxygen transmission rates are measured according to ASTM D-3985 at 23° C. at the indicated relative humidities. Glass transition temperatures ($T_g$) are measured by differential scanning calorimetry at a heating rate of 10° C./min.

COMPARATIVE EXAMPLE 1 (NOT AN EXAMPLE OF THIS INVENTION)

A. Preparation of Methylol Polyester 1

A 100 mL minireactor, equipped with a mechanical stirrer, two nitrogen inlets, and a thermometer is charged with the diglycidyl ether of hydroquinone (8.12 g, 36.3 mmol, epoxy equivalent weight 111.67 g/equiv. epoxide), terephthalic acid, (5.99 g, 36.0 mmol). and tetrakis(n-butyl)ammonium bromide (4.01 g, 12.5 mmol). The mixture is stirred while flowing nitrogen into the reactor and adding diglyme (50 mL) and then heated to 155° C. for 6 hours. The resulting two-phase product mixture is poured into 500 mL of water in a blender and the precipitated product is collected by filtration and dried in a vacuum oven at 60° C. overnight. The filtered product is dissolved in DMF (100 mL), and the solution is poured into 500 mL of water in a blender. The reprecipitated product is collected by filtration and dried under vacuum at 60° C. overnight. The product has an inherent viscosity of 0.37 dL/g as measured in DMF at 25° C., a $T_g$ of 76° C. as measured by differential scanning calorimetry, and an oxygen transmission rate of 0.34 cc-mil/100 in$^2$-24 h-atm at 50% R.H.

B. Blend with PETG

A powdered mixture consisting of 9 parts PETG and 1 part Methylol Polyester 1 is tumble-mixed and dried in a vacuum oven at 80° C. overnight. The dried mixture is extruded in a Randcastle Extrusion Systems ¼" barrel diameter single screw extruder equipped with a ⅛" strand die. The temperature setpoints in the four control zones are b 370° F. in the Feed zone, 380° F. in Zone 2, and 390° F. in Zone 3 and the die. The blend is extruded at 100 rpm: the molten strand is quenched in a water bath and pelletized. The molten strand and resulting pellets are hazy, indicating an immiscible blend. The pellets are dried in a vacuum oven at 80° C. overnight and compression molded into 4"×4"×0.10"films for oxygen permeability testing. The films have an oxygen transmission rate (OTR) of 14.59 cc-mil/100 in$^2$-24 h-atm at 76% relative humidity, and a single $T_g$ of 80.1° C. The single $T_g$ in this case results from the proximity of the individual component $T_g$'s and not from miscibility.

Pure FETG, when molded under the same conditions, has an oxygen transmission rate of 17.7 cc-mil/100 in$^2$-24 h-atm at 60% R. H., and a $T_g$ of 79.5° C. The calculated oxygen transmission rate for this blend, based on a linear weight fraction average, is 15.98 cc-mil/100 in$^2$-24 h-atm.

EXAMPLE 1

A. Preparation of Methylol Polyester 2

A 500 mL flask, equipped with a mechanical stirrer, condenser, and nitrogen inlet is charged with the diglycidyl ether of bisphenol A (85.0 g, 0.245 mmol), isophthalic acid (40.9 g, 0.246 mol), and tetrakis(n-butyl)ammonium bromide (20.g, 62 mmol). The flask is purged with nitrogen and dioxane (250 mL) is added. The resulting mixture is heated to reflux for 3.5 hours and glacial acetic acid (5 mL) is added. The mixture is stirred at reflux for an additional hour and is allowed to cool to 25° C. The solution is poured into 2L of water and the resulting precipitate is collected by filtration and dried under vacuum at 70° C. overnight. The product is then dissolved in dioxane (550 mL) and reprecipitated by pouring into 2L of water. The product is collected by filtration and dried under vacuum. The product has an inherent viscosity of 0.48 dL/g, as measured in DMF at 25° C., an oxygen transmission rate of 1.9 cc-mil/100 in$^2$—24-atm, and a $T_g$ of 97° C.

B. Blend with PETG

A powdered mixture consisting of 9 parts PETG and 1 part methylol polyester 2 is tumble-mixed and dried in vacuum oven at 80° C. overnight. The dried mixture is extruded in a Randcastle Extrusion Systems ¼" barrel diameter single screw extruder equipped with a ⅛"strand die. The temperature setpoints in the four control zones are 370° C. in the Feed Zone, 380° F. in Zone 2, and 390° F. in Zone 3 and the die. The blend is extruded at 100 rpm; the molten strand is quenched in a water bath and pelletized. The molten strand and resulting pellets show excellent clarity, indicating a miscible blend. The pellets are dried in a vacuum oven at 80° C. overnight and compression molded into 4"×4"×0.010"films for oxygen permeability testing. The films have an oxygen transmission rate (OTgR) of 10.32 cc-mol/100 in$^2$—24 h-atm at 60% relative humidity, and a single $T_g$ of 81.6%.

Pure PETG, molded under identical conditions, has an oxygen transmission rate of 17.7 cc-mil/100 in$^2$—24h-atm. The calculated oxygen transmission rate for the blend of this example, based upon a linear weight fraction average, is 16.13 cc-mil/100 in$^2$—24 h-atm. Thus, the miscible blend exhibits a greater improvement in barrier properties compared to pure PETG and the immiscible blend of Comparative Example 1, as well as provides excellent clarity.

C. Blend with PET

To a mixture of phenol (60 parts) and tetrachloroethane (40 parts) is added poly(ethylene terephthalate) pellets (Kodapak 7741, Eastman Kodak Co.. 9.0 g) and Methylol Folyester 2 (1.0 g). The mixture is shaken mechanically until a clear solution is obtained. This solution is poured into methanol (500 mL) in a Waring blender. The powdery, white product is collected by filtration and washed in fresh methanol for 3 days, changing the solvent daily. The product is dried in a vacuum oven at 95° C. for 16 hours and 130° C. for 24 hours. The product is compression molded into 4"×4"×0.010"films for oxygen permeability testing. The films have an OTR of 7.27 cc-mil/100 in$^2$-day-atm (D.U.) at 60% R.H. The films have a glass transition temperature of 80° C., and a melting temperature of 250° C. after molding.

A film of poly(ethylene terephthalate) molded under conditions identical to those used above has an OTR of 8.70 cc-mil/100 in$^2$-day-atm.

These results show that the miscible blends of the present invention exhibit improved barrier to oxygen relative to pure PET. The single glass transition of the blend also indicates that the components of the blend are miscible.

What is claimed is:

1. A polymeric composition comprising a miscible blend of components:
   A) a linear, saturated polyester of aromatic diacids; and
   B) a thermoplastic methylol polyester which is miscible with Component A and which has repeating units represented by the formula:

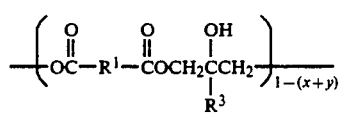
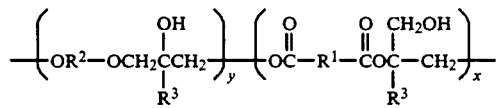

Formula I wherein each of $R^1$ and $R^2$ is individually a divalent organic moiety which is predominantly hydrocarbon, each $R^3$ is individually hydrogen or lower alkyl, y is about 0.5, and x is a fraction from about 0.05 to about 0.4, said component B being present in an amount sufficient to provide improved oxygen barrier property as compared to a composition which does not contain Component B.

2. The composition of claim 1 wherein Component A is present in an amount of from about 5 to about 95 weight percent of the blend and Component B is present in an amount of from about 95 to about 5 weight percent of the blend.

3. The composition of claim 1 wherein $R^1$ is a first divalent organic moiety such as 1,3-phenylene, 1,4-phenylene, 2,6-naphthalene, and/or biphenylene and, optionally, minor amounts of a second divalent organic moiety which is different from the first divalent organic moiety, such as alkylene, cycloalkylene, alkenylene, arylene, alkylarylene, dialkylenearylene, diaryleneketone, diarylenesulfone, diarylenesulfoxide. alkylidenediarylene, diaryleneoxide. diarylenesulfide, and diarylenecyanomethane, said minor amounts being such that the mole ratio of 1,3-phenylene, 1,4-phenylene, 2,6-naphthalene, and/or biphenylene to the second divalent organic moiety is greater than about 0.80, with the proviso that Component B remains miscible with Component A.

4. The composition of claim 1 wherein $R^2$ is a first divalent organic moiety such as bisphenyleneisopropylidene and, optionally, minor amounts of a second divalent organic moiety which is different from the first divalent organic moiety such as alkylene, cycloalkylene, alkenylene, arylene, alkylarylene, dialkylenearylene. diaryleneketone, diarylenesulfone, diarylenesulfoxide, alkylidenediarylene, diaryleneoxide, diarylenesulfide, and diarylenecyanomethane, said minor amounts being such that the mole ratio of bisphenyleneisopropylidene to the second divalent organic moiety is greater than about 0.80, with the proviso that Component B remains miscible with Component A.

5. The composition of claim 1 wherein $R^1$ is 1,3-phenylene, 1,4-phenylene, 2,6-naphthalene, or biphenylene, $R^2$ is bisphenyleneisopropylidene, $R^3$ is hydrogen, and x is a fraction from about 0.05 to 0.4.

6. The composition of claim 5 wherein Component A comprises poly(ethylene terephthalate).

7. The composition of claim 5 wherein Component A comprises poly(ethylene-co-1,4-cyclohexanedimethylene terephthalate).

8. The composition of claim 1 wherein Component B is a thermoplastic methylol polyester having repeating units represented by the formula:

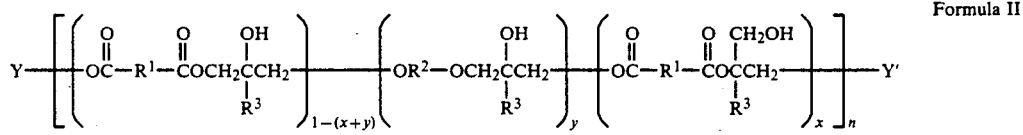

Formula II herein each Y and Y' is individually hydrogen or a monovalent organic terminating group, $R^1$, $R^2$, and $R^3$ are as defined before and n is a whole number from 10 to 1000.

9. The composition of claim 8 wherein $R^1$ is 1,3-phenylene, 1,4-phenylene, 2,6-naphthalene, or biphenylene, $R^2$ is bisphenyleneisopropylidene, $R^3$ is hydrogen, and x is a fraction from about 0.05 to 0.4.

10. The composition of claim 8 wherein Component A comprises poly(ethylene terephthalate).

11. The composition of claim 8 wherein Component A comprises poly(ethylene-co-1,4-cyclohexanedimethylene terephthalate).

12. The composition of claim 1 in the form of a barrier container.

13. The composition of claim 1 in the form of a barrier film.

14. The composition of claim 1 in the form of a barrier coating.

15. The composition of claim 1 in the form of a foamed article.

* * * * *